May 15, 1934.                    W. H. WEDGER                    1,959,321
METHOD AND COMPOSITION FOR USE IN SECURING TOGETHER PIECES OF STOCK
Filed Dec. 29, 1931
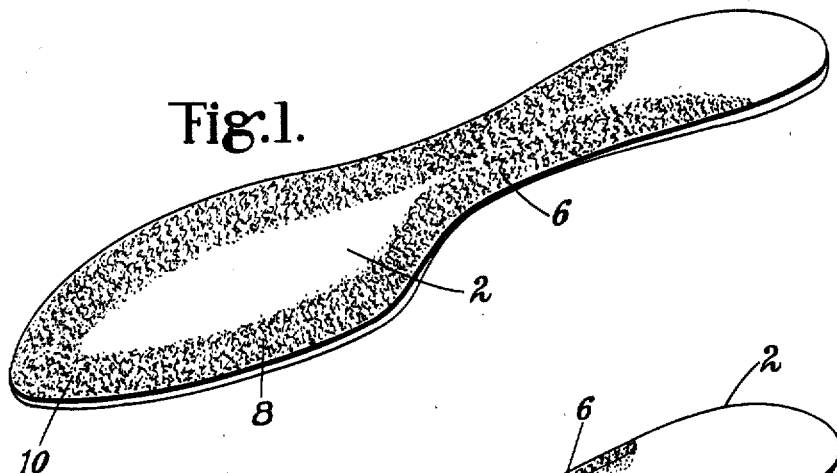
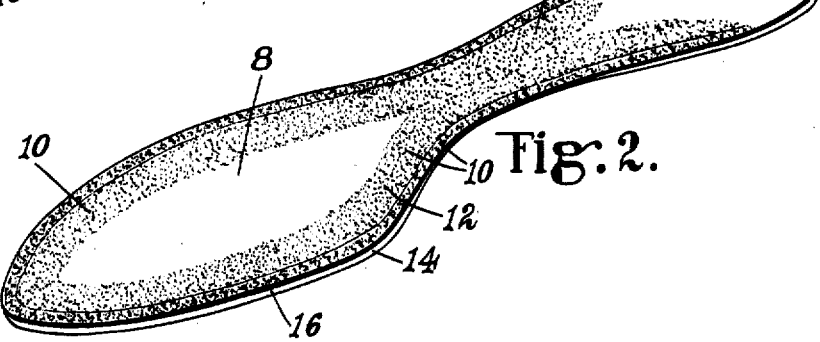
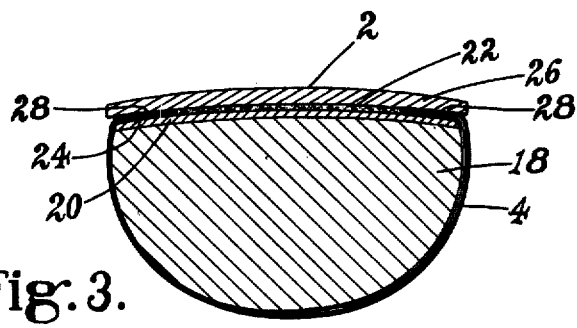
INVENTOR
Walter H. Wedger
By his Attorney,
Harlos M. Davis Patented May 15, 1934

1,959,321

UNITED STATES PATENT OFFICE 1,959,321

METHOD AND COMPOSITION FOR USE IN SECURING TOGETHER PIECES OF STOCK

Walter H. Wedger, Belmont, Mass., assignor to Boston Blacking & Chemical Co., Boston, Mass., a corporation of Massachusetts Application December 29, 1931, Serial No. 583,773

21 Claims. (Cl. 154—40)

This invention relates to improvements in the securing together of pieces of stock by means of cement which, as illustrated herein, is applied to one or more of the pieces of stock, permitted to dry, and activated or cut substantially immediately prior to the placing of the pieces of stock in juxtaposition under pressure. The invention includes also novel compositions for cutting such cement which has been applied to pieces of stock and dried, and novel methods of activating or cutting such dried cement or portions thereof. The invention is disclosed herein with particular reference to the manufacture of shoes wherein the soles are permanently secured to the over-lasted portions of their uppers by pyroxylin cement, though it should be understood that the invention in various of its phases is in no way limited to use in shoe manufacture.

The features of the present disclosure directed to the application of the softener to predetermined areas of hardened cement and to step-products produced thereby are claimed in my copending divisional application, Serial No. 655,077, filed February 3, 1933.

In the manufacture of shoes wherein the soles are cement-attached to the uppers it has been the practice to apply pyroxylin cement to the bottom surface of the shoe upper and to the cooperating marginal portion of the attaching surface of the sole, and to permit the cement to dry. The cement on one or both of the shoe parts subsequently has been activated or cut with a softener, the shoe parts then assembled and placed under pressure which is maintained while the cement is setting or becoming sufficiently adhesive to hold the shoe parts together without the aid of external pressure. Ordinarily the activation of the cement has been accomplished by applying a cement-solvent or softener with a brush to the cement-coated surfaces of the upper and sole, or the cement upon the sole only has been activated by brushing the softener on the cemented area of the sole or by dipping the cement-coated surface of the sole into a cement-solvent.

While many million pairs of shoes have been manufactured in accordance with the aforementioned practices, such practices have frequently been accompanied by certain undesirable results, for example staining and soiling of one or both of the shoe parts, due in part to lack of control over the softener. Thus, staining and soiling of the shoe uppers has frequently occurred as a result of "squeeze-out" of the softener or cement softened thereby, and as a result of the presence of the softening medium at the edge, particularly, of the sole.

Moreover, the time required for setting of the cement sufficiently to permit the removal of the pressure has necessitated maintaining the shoe parts under pressure for relatively long periods of time.

If, as has been proposed, additional cement of the character heretofore available is used as a softening medium, the maintenance of the assembled shoe parts under pressure over relatively long periods of time is necessitated, for example, for 30 minutes or more, thereby tying up the use of the pressure applying apparatus to that extent.

The use of the usual pyroxylin solvents as softeners has been subjected to further restrictions in that it is necessary to allow sufficient time for the assembly of the shoe parts after the cement-solvent has been applied. The use of the more highly volatile solvents as softeners has also been proposed, but has in most cases been impracticable, due to the immediate substantial evaporation thereof. The use of the less volatile cement-solvents as softeners, which are those that have been generally used and which permit sufficient time for the assembly of the shoe parts, has resulted also in requiring the maintenance of the shoe upper and sole under pressure for a relatively long time, usually 20 to 30 minutes, resulting again in the tying up of a large amount of pressure applying apparatus.

With the foregoing circumstances in view, and to reduce the period of time during which the pressure must be maintained, I made the invention of my copending application for Letters Patent of the United States Serial No. 508,368 filed January 12, 1931, which discloses a softener for use in cutting pyroxylin cement as well as an improved method of shoemaking based upon reducing the evaporation of a highly volatile softener by the addition thereto of material which raised its viscosity and which apparently, while the film of solvent on the cement is exposed to the air, forms a skin or "blanket" which protects the underlying softener from evaporation. The invention of said copending application has resulted in reducing substantially the period of time during which the shoes and soles must be maintained under pressure, to under ten minutes, for example five or six minutes, under typical shoe factory conditions, or to an even shorter time under the most favorable circumstances.

It is, accordingly, an object of the present invention to provide an improved softening medium and an improved method involving the use of a softener, by the employment of which the dangers and difficulties heretofore encountered will be substantially eliminated and the rapid production of clean shoes with securely attached soles will be assured. As illustrated herein, this is accomplished by applying to the hardened cement on the sole and/or shoe bottom a somewhat viscous or plastic softener which, as disclosed herein, comprises a composition containing a relatively small quantity of a suitable cellulose derivative, preferably one which itself has a high viscosity characteristic, dissolved in a relatively volatile solvent. The use of the hereindisclosed softening composition which evaporates rapidly after pressure is applied and yet, in spite of the high volatility of its solvent constituent, permits ample time for the assembly of the shoes before pressure is applied, reduces the period of time during which the shoes must be maintained under pressure to a greater extent even than did the invention of my copending application Serial No. 508,368, thus further reducing the number of pressure applying devices necessary for any given shoe production and making generally for more efficient manufacturing conditions.

In the drawing,

Fig. 1 is a perspective view of a sole to which cement has been applied as a step in the practice of the method of my invention;

Fig. 2 is a perspective view of the sole after application of the softening composition thereto and illustrates the step-product referred to; and Fig. 3 is a transverse sectional view taken through a shoe the sole of which has been secured to the upper by the method of my invention.

As a specific example of the manner in which my invention may be practiced in the manufacture of shoes, the overlasted portion of the shoe upper and the marginal portion of the sole are roughened or scoured. Pyroxylin cement is then applied to the sole and the overlasted portion of the shoe upper in any suitable manner and is permitted to dry. The cement may desirably be applied, as illustrated in Fig. 1, to the marginal portions of the shank 6 and forepart 8 of the sole 2 in the form of a strip or ribbon 10 of suitable width by a sole-cementing machine such, for example, as that disclosed in United States Letters Patent No. 1,928,693, granted October 3, 1933, on an application of A. S. Johnson. Cement may conveniently be applied to the marginal portion of the shank and forepart of the shoe bottom by a shoe bottom cementing machine, such as shown in an application for Letters Patent of the United States, Serial No. 574,833, filed November 13, 1931, in the name of Wilbur L. MacKenzie.

When it is desired that the sole be molded or conformed, the cement-coated sole is mulled or tempered, and shaped. If a relatively long period of time elapses between the sole-conforming or molding and the sole-attaching operations, the sole may be brought again into temper just prior to the sole-attaching operation.

Before the application of softener to the sole, whether or not the sole is conformed or molded, the sole is preferably mulled or tempered in order to make the same more flexible, and to reduce the tendency of the sole to pull away from the upper after the release of the sole-attaching pressure.

The composition with which the cement is cut or softened preferably is of relatively high viscosity as compared to the solvents heretofore used, but of a substantially lower viscosity than that of the usual pyroxylin cements, and comprises a relatively small amount of nitrocellulose dissolved in a volatile solvent. This softening composition may be progressively applied to the sole 2 in the form of a uniform ribbon 12 (Fig. 2) disposed on the cemented area 10 with the outer margin of the ribbon 12 spaced inwardly from the peripheral edge 14 of the sole 2 to leave an unactivated narrow band of cement 16 adjacent to the edge of the sole. The stripping of the cement with the softening composition conveniently may be accomplished by means of a machine similar to that shown in said United States Letters Patent No. 1,928,693 of A. S. Johnson.

As quickly as possible after the completion of the progressive or other application of the softener to the sole, and preferably within from 5 to 10 seconds thereafter (although this period may be two or three times longer), the sole and shoe are brought into assembled relation and placed under pressure and the pressure maintained until the cement has set sufficiently or become sufficiently adhesive to hold the sole and shoe upper together after the pressure has been released. The shoe parts may be brought into assembled relation and maintained under pressure conveniently in a cement sole attaching machine such as that shown in United Shates Letters Petters Patent No. 1,897,105, granted February 14, 1933, on an application of Milton H. Ballard.

The relationship of a shoe upper and sole after assembly and after the application and release of pressure is illustrated in Fig. 3 wherein is shown a last 18 and insole 20 over which the upper 4 is lasted. Filler 22 of felt or other suitable material is disposed on the insole 20 between the overlasted portions 24 of the upper. The outsole 2 which is cemented to the overlasted portions 24 of the upper extends outwardly somewhat beyond the overlasted portions of the upper. The areas 28 over which the sole 2 and upper 4 are cemented together are indicated in this figure by heavy lines in Fig. 3 which may also be taken as indicating the sole-attaching cement, but are shown, for convenience of illustration, as of exaggerated thickness. The absence of softening composition and/or cement from the non-overlasted portion of the shoe upper adjacent to the sole should be noted. This advantageous condition is believed to be due, first, to the non-activation in the first instance of the cement on the peripheral portion 16 of sole, and second, to the nondisplacement of the softener and/or softened cement laterally and outwardly substantially beyond the outer boundary of contact of shoe upper and sole.

With the procedure outlined above and the specific softening compositions disclosed hereinafter, it is possible to provide on a commercial scale a cement-bonded union of sole to upper of great strength and at the same time safely to permit the removing of the assembled shoe from the sole attaching machine after the pressure has been applied for only about one or two minutes. The upper and the sole, moreover, will be clean, unstained and free from excess cement.

An example of a softening composition which I find suitable for use in the practice of the above method comprises 40 grams on the dry basis of nitrocellulose of a nominal 1100-seconds viscosity (the viscosity of the commercial 1100-second product ranges from about 1000 to about 1200 seconds), 18 cc. of denatured alcohol (used to wet the nitrocellulose to make it safe to handle) and 900 cc. of acetone. The viscosity of this composition at 25° C. I have determined to be about 50 on the McMichael scale when a disk of 6 cm. diameter and a wire of #22 B. & S. gauge is employed and the disk is rotated at 19 R. P. M. This viscosity comes within the range of about 1000 to 1500 centipoises.

The viscosity-characteristic of the nitrocellulose itself is referred to in terms of seconds in accordance with usual commercial practice, this viscosity being determined as described on pages 277-278 of a Bulletin of the American Society for Testing Materials entitled "Tentative Specifications and Tests for Soluble Nitrocellulose", issued 1929, revised 1930. Further, the numerical value of the viscosity of the nitrocelluloses referred to herein, unless otherwise designated, relates to the present day commercial products the actual viscosities of which vary within limits in the neighborhood of plus or minus 10%.

It will be seen that the above-described softening composition has a relatively high viscosity together with a low solid content which in the above instance is something less than 5%. Under present manufacturing conditions for best results the desideratum appears to be a nitrocellulose of as high viscosity as possible with an accompanying low solid content, thereby producing a softener of relatively high viscosity, and of a somewhat plastic nature, resulting, when the softener is applied in the form of a relatively thin ribbon, in only a slight lateral displacement when the assembled shoe parts are put under pressure.

In some instances, it may be satisfactory to obtain the desired body of the composition by employing larger quantities of lower viscosity nitrocellulose. Thus, I have made up softening compositions using nitrocelluloses of as low as about one hundred seconds viscosity with generally satisfactory results, and, indeed, certain of the benefits of my invention may be obtained by employing nitrocelluloses of a still lower viscosity. However, as the nitrocellulose viscosity goes down, the concentration of the nitrocellulose, and hence the solid content, must be increased, with increasing danger of "squeeze-out" and dirty shoes. As the lower limits of nitrocellulose viscosity are approached the time during which the pressure must be maintained increases.

While the viscosity of the nitrocellulose content of the softening composition may be varied somewhat, as indicated in the preceding paragraph, the viscosity of the composition itself under existing conditions preferably should not be brought substantially below that wherein a ribbon of the material will remain in position when placed on dried cement without substantial flowage. The viscosity of the composition may be varied upwardly to a considerable extent, but in most instances I find it of no particular advantage to increase the viscosity beyond the point where a ribbon of the composition applied to a sole will retain its shape.

I have found acetone exceptionally suitable as a solvent in this work since it cuts or softens nitrocellulose unusually readily and is sufficiently volatile. In order to have the cement set sufficiently within one minute or thereabouts to permit removal of the shoe from the pressure applying machine, I prefer to employ nitrocellulose solvents having a boiling point of 30° to 80° C.. A solvent consisting of a single substance or a mixture of substances may, of course, be employed. Examples of other solvents, which are useful particularly in mixtures, are ether and ethyl acetate. Some of the usual higher boiling solvents may in certain instances advantageously be associated with the composition where a less rapid setting of the softened cement is required.

There may be present in the softening composition other ingredients which do not adversely affect to an appreciable extent the quick setting of the softened cement. Thus, for example, in some instances, small quantities of a plasticizer, such as dibutyl phthalate, may be employed. Also in some instances, diluents, for example, hydrocarbons such as pentane, hexane, or benzol, may be present in the softening composition.

While I have specifically illustrated my invention in connection with nitrocellulose or pyroxylin cements and softening compositions, the invention may likewise be practiced with the aid of other cellulose derivatives, such as cellulose acetate, ethyl cellulose, benzyl cellulose or other cellulose esters or ethers, by following the principles hereinabove outlined. Thus, a softener embodying one of the cellulose derivatives may be used in conjunction with a cement embodying the same or another cellulose derivative.

Having thus described my invention, what I claim as new and desire to secure by Letters Patent of the United States is:

1. A softener for activating dry pyroxylin cement comprising a volatile nitrocellulose solvent in which is dissolved sufficient high viscosity nitrocellulose to give the softener a plasticity such that it will stay where it is placed on the dry pyroxylin cement without substantial flowage but will flow a short distance under pressure applied thereto.

2. A high viscosity softener for cutting dried pyroxylin cement, comprising a small amount of cellulose ester or ether dissolved in a highly volatile solvent.

3. A high viscosity softener for cutting dried pyroxylin cement, comprising a small amount of high viscosity nitrocellulose dissolved in a highly volatile solvent.

4. A composition for use in cutting nitrocellulose cement which has been applied to a shoe part and dried comprising a low boiling solvent for nitrocellulose containing a relatively small amount of nitrocellulose of at least several hundred seconds viscosity whereby the composition has a high viscosity and a low nitrocellulose content.

5. A composition for cutting hardened nitrocellulose cement comprising a solvent for nitrocellulose boiling in the neighborhood of 30 to 80° C. and containing dissolved material including nitrocellulose of a viscosity of at least several hundred seconds, in amount such that the composition has a viscosity of about 1000 to 1500 centipoises.

6. A composition for cutting hardened nitrocellulose cement comprising a solvent for nitrocellulose boiling in the neighborhood of 30 to 80° C. and containing dissolved material including nitrocellulose of a viscosity of at least several hundred seconds, in amount such that the composition has a viscosity of above 500 centipoises.

7. A composition for cutting hardened nitrocellulose cement comprising a solvent for nitrocellulose boiling in the neighborhood of 30 to 80° C. and containing dissolved material including nitrocellulose of a viscosity of at least several hundred seconds, in amount such that a strip of said composition has sufficient plasticity to cause it to remain substantially in its applied position on hardened nitrocellulose cement.

8. A high viscosity composition for use in cutting dry nitrocellulose cement comprising a low boiling solvent for nitrocellulose having dissolved therein nitrocellulose of about 1100-seconds viscosity.

9. A composition for use in cutting dry nitrocellulose cement comprising acetone having dissolved therein sufficient nitrocellulose of about 1100-seconds viscosity to impart to the composition a viscosity of about 1000 to 1500 centipoises.

10. A composition for use in cutting dried pyroxylin cement comprising 1 part by weight of pyroxylin of at least several hundred seconds viscosity dissolved in from about 10 to 30 parts of a low-boiling solvent.

11. A composition for use in cutting pyroxylin cement which has been applied to a shoe part and dried, comprising 1 part by weight of nitrocellulose of about 1100-seconds viscosity dissolved in about 18 to 20 parts of a low-boiling solvent.

12. A composition for use in cutting dry pyroxylin cement, comprising from about 3 to 6% of nitrocellulose dissolved in acetone, the nitrocellulose having a viscosity characteristic of not less than about a hundred seconds.

13. A composition for use in cutting dry pyroxylin cement, comprising not over about 5% of nitrocellulose dissolved in acetone, the nitrocellulose having a viscosity characteristic of not less than several hundred seconds.

14. A composition for use in cutting dried pyroxylin cement comprising nitrocellulose of about 1100-seconds viscosity dissolved in acetone in the proportions of about 40 grams of nitrocellulose on the dry basis to about 900 cc. of acetone.

15. A composition for use in cutting dried pyroxylin cement comprising the following ingredients in about the following proportions:

1100-seconds nitrocellulose—40 grams on the dry basis
alcohol—18 grams
acetone—900 cc.

16. That improvement in methods of securing parts together which comprises applying pyroxylin cement to at least one of the parts to be secured together, permitting the cement to harden, cutting the hardened cement on at least one of the parts with a low boiling solvent for nitrocellulose containing sufficient nitrocellulose of at least several hundred seconds viscosity to render the cutting composition sufficiently plastic substantially to remain in its applied shape and position on the hardened cement until pressure is applied, and bringing the parts together under pressure.

17. That improvement in methods of securing parts together which comprises applying nitrocellulose cement to at least one of the parts, permitting the cement to harden, cutting the hardened cement on at least one of the parts with a highly viscous solution of nitrocellulose of about 1100-seconds viscosity in a solvent for nitrocellulose boiling at from about 30° to about 80° C., and bringing the parts together under pressure.

18. That improvement in methods of securing parts together which comprises applying cellulose derivative cement to at least one of the parts to be secured together, permitting the cement to dry, activating the dried cement on at least one of the parts by applying thereto a highly viscous solution of high viscosity cellulose derivative in a low boiling solvent, and bringing the parts together under pressure.

19. That improvement in methods of securing together two parts each of which is coated with dry cellulose derivative cement which comprises activating the dry cement on one of the parts by applying thereto a highly viscous solution of high viscosity cellulose derivative in a low boiling solvent, and bringing the parts together under pressure.

20. That improvement in methods of securing parts together which comprises applying cellulose derivative cement to at least one of the parts to be secured together, permitting the cement to dry, activating the dried cement on at least one of the parts by applying thereto a low boiling solvent having dissolved in 10 to 20 parts thereof about 1 part of cellulose derivative whose viscosity characteristic is sufficiently high to impart to the activating composition the property of staying where it is placed on the film of cement without substantial flowage when not under pressure, and bringing the parts together under pressure.

21. A composition for cutting hardened cellulose derivative cement comprising a solvent for the cellulose derivative boiling in the neighborhood of 30 to 80° C. and containing sufficient high viscosity cellulose derivative to render the cutting composition sufficiently plastic to remain where it is placed on the cement without substantial flowage when not under pressure.

WALTER H. WEDGER.

DISCLAIMER 1,959,321.—*Walter H. Wedger*, Belmont, Mass. METHOD AND COMPOSITION FOR USE IN SECURING TOGETHER PIECES OF STOCK. Patent dated May 15, 1934. Disclaimer filed September 15, 1941, by the assignee, *B. B. Chemical Co.*

Hereby enters this disclaimer to claims 1, 2, 3, 4, 7, 8, 16, 17, 18, 19, 20, and 21 of said Letters Patent.

[*Official Gazette October 7, 1941.*]

8. A high viscosity composition for use in cutting dry nitrocellulose cement comprising a low boiling solvent for nitrocellulose having dissolved therein nitrocellulose of about 1100-seconds viscosity.

9. A composition for use in cutting dry nitrocellulose cement comprising acetone having dissolved therein sufficient nitrocellulose of about 1100-seconds viscosity to impart to the composition a viscosity of about 1000 to 1500 centipoises.

10. A composition for use in cutting dried pyroxylin cement comprising 1 part by weight of pyroxylin of at least several hundred seconds viscosity dissolved in from about 10 to 30 parts of a low-boiling solvent.

11. A composition for use in cutting pyroxylin cement which has been applied to a shoe part and dried, comprising 1 part by weight of nitrocellulose of about 1100-seconds viscosity dissolved in about 18 to 20 parts of a low-boiling solvent.

12. A composition for use in cutting dry pyroxylin cement, comprising from about 3 to 6% of nitrocellulose dissolved in acetone, the nitrocellulose having a viscosity characteristic of not less than about a hundred seconds.

13. A composition for use in cutting dry pyroxylin cement, comprising not over about 5% of nitrocellulose dissolved in acetone, the nitrocellulose having a viscosity characteristic of not less than several hundred seconds.

14. A composition for use in cutting dried pyroxylin cement comprising nitrocellulose of about 1100-seconds viscosity dissolved in acetone in the proportions of about 40 grams of nitrocellulose on the dry basis to about 900 cc. of acetone.

15. A composition for use in cutting dried pyroxylin cement comprising the following ingredients in about the following proportions:

1100-seconds nitrocellulose—40 grams on the dry basis
alcohol—18 grams
acetone—900 cc.

16. That improvement in methods of securing parts together which comprises applying pyroxylin cement to at least one of the parts to be secured together, permitting the cement to harden, cutting the hardened cement on at least one of the parts with a low boiling solvent for nitrocellulose containing sufficient nitrocellulose of at least several hundred seconds viscosity to render the cutting composition sufficiently plastic substantially to remain in its applied shape and position on the hardened cement until pressure is applied, and bringing the parts together under pressure.

17. That improvement in methods of securing parts together which comprises applying nitrocellulose cement to at least one of the parts, permitting the cement to harden, cutting the hardened cement on at least one of the parts with a highly viscous solution of nitrocellulose of about 1100-seconds viscosity in a solvent for nitrocellulose boiling at from about 30° to about 80° C., and bringing the parts together under pressure.

18. That improvement in methods of securing parts together which comprises applying cellulose derivative cement to at least one of the parts to be secured together, permitting the cement to dry, activating the dried cement on at least one of the parts by applying thereto a highly viscous solution of high viscosity cellulose derivative in a low boiling solvent, and bringing the parts together under pressure.

19. That improvement in methods of securing together two parts each of which is coated with dry cellulose derivative cement which comprises activating the dry cement on one of the parts by applying thereto a highly viscous solution of high viscosity cellulose derivative in a low boiling solvent, and bringing the parts together under pressure.

20. That improvement in methods of securing parts together which comprises applying cellulose derivative cement to at least one of the parts to be secured together, permitting the cement to dry, activating the dried cement on at least one of the parts by applying thereto a low boiling solvent having dissolved in 10 to 20 parts thereof about 1 part of cellulose derivative whose viscosity characteristic is sufficiently high to impart to the activating composition the property of staying where it is placed on the film of cement without substantial flowage when not under pressure, and bringing the parts together under pressure.

21. A composition for cutting hardened cellulose derivative cement comprising a solvent for the cellulose derivative boiling in the neighborhood of 30 to 80° C. and containing sufficient high viscosity cellulose derivative to render the cutting composition sufficiently plastic to remain where it is placed on the cement without substantial flowage when not under pressure.

WALTER H. WEDGER.

DISCLAIMER 1,959,321.—*Walter H. Wedger*, Belmont, Mass. METHOD AND COMPOSITION FOR USE IN SECURING TOGETHER PIECES OF STOCK. Patent dated May 15, 1934. Disclaimer filed September 15, 1941, by the assignee, *B. B. Chemical Co.*

Hereby enters this disclaimer to claims 1, 2, 3, 4, 7, 8, 16, 17, 18, 19, 20, and 21 of said Letters Patent.

[*Official Gazette October 7, 1941.*]